(12) United States Patent
Brandt

(10) Patent No.: US 11,556,257 B2
(45) Date of Patent: Jan. 17, 2023

(54) SELECTABLE WEAR LIFE INDICATOR BASED ON DATA RETENTION

(71) Applicant: Micron Technology, Inc., Boise, ID (US)

(72) Inventor: Kevin R. Brandt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 27 days.

(21) Appl. No.: 16/993,982

(22) Filed: Aug. 14, 2020

(65) Prior Publication Data

US 2022/0050610 A1 Feb. 17, 2022

(51) Int. Cl.
*G06F 3/06* (2006.01)

(52) U.S. Cl.
CPC .......... *G06F 3/0632* (2013.01); *G06F 3/0616* (2013.01); *G06F 3/0673* (2013.01)

(58) Field of Classification Search
CPC ..... G06F 3/0632; G06F 3/0616; G06F 3/0673
See application file for complete search history.

(56) References Cited

U.S. PATENT DOCUMENTS

| | | | |
|---|---|---|---|
| 9,213,944 B1 | 12/2015 | Do et al. | |
| 9,349,103 B2 | 5/2016 | Eberhardt, III et al. | |
| 9,652,719 B2 | 5/2017 | Bounouane | |
| 11,062,746 B1* | 7/2021 | Wu | G11C 29/08 |
| 2003/0182520 A1* | 9/2003 | Tsunemiya | G06F 9/445 |
| | | | 348/E5.042 |
| 2007/0266200 A1* | 11/2007 | Gorobets | G06F 11/008 |
| | | | 711/103 |
| 2009/0204853 A1* | 8/2009 | Diggs | G06F 3/0616 |
| | | | 714/47.2 |
| 2010/0122200 A1* | 5/2010 | Merry, Jr. | G11C 16/349 |
| | | | 715/771 |
| 2010/0262792 A1* | 10/2010 | Hetzler | G06F 11/008 |
| | | | 711/156 |
| 2012/0124273 A1* | 5/2012 | Goss | G11C 16/349 |
| | | | 711/103 |
| 2012/0203951 A1* | 8/2012 | Wood | G11C 16/28 |
| | | | 711/102 |
| 2014/0181363 A1* | 6/2014 | Hoang | G06F 12/0246 |
| | | | 711/103 |
| 2015/0169398 A1* | 6/2015 | Chunn | G06F 11/3034 |
| | | | 714/763 |
| 2015/0339064 A1* | 11/2015 | Feng | G06F 12/0888 |
| | | | 711/103 |
| 2016/0070474 A1* | 3/2016 | Yu | G06F 3/064 |
| | | | 711/103 |
| 2016/0180959 A1* | 6/2016 | Darragh | G06F 11/073 |
| | | | 365/185.09 |
| 2017/0131947 A1* | 5/2017 | Hoang | G06F 11/3034 |
| 2017/0206026 A1* | 7/2017 | Narayanan | G06F 3/0614 |
| 2017/0285970 A1* | 10/2017 | Li | G06F 3/0616 |
| 2018/0276061 A1* | 9/2018 | An | G06F 11/0706 |
| 2019/0034114 A1* | 1/2019 | Natarajan | G06F 3/0619 |
| 2019/0138226 A1* | 5/2019 | Kanno | G06F 3/0679 |

* cited by examiner

*Primary Examiner* — Tracy A Warren
(74) *Attorney, Agent, or Firm* — Brooks, Cameron & Huebsch, PLLC

(57) ABSTRACT

A processor of a memory sub-system can select a data retention profile from among a plurality of data retention profiles corresponding to the memory device. The processor can also adjust a wear life indicator based on the selected data retention profile.

20 Claims, 4 Drawing Sheets

480 ─

```
┌─────────────────────────────────────────────────────┐
│ RECEIVING, AT A MEMORY SUB-SYSTEM,                  │
│ A SELECTION OF A DATA RETENTION PROFILE FROM AMONG  │─481
│ A PLURALITY OF DATA RETENTION PROFILES              │
└─────────────────────────────────────────────────────┘
                          │
┌─────────────────────────────────────────────────────┐
│ DETERMINING A WEAR LIFE INDICATOR CORRESPONDING TO  │─482
│ THE SELECTED DATA RETENTION PROFILE                 │
└─────────────────────────────────────────────────────┘
                          │
┌─────────────────────────────────────────────────────┐
│ PROVIDING, TO A HOST, INFORMATION CORRESPONDING     │─483
│ TO THE WEAR LIFE INDICATOR                          │
└─────────────────────────────────────────────────────┘
```

SELECTABLE WEAR LIFE INDICATOR BASED ON DATA RETENTION

TECHNICAL FIELD

Embodiments of the disclosure relate generally to memory sub-systems, and more specifically, relate to a selectable wear life indicator based on data retention for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
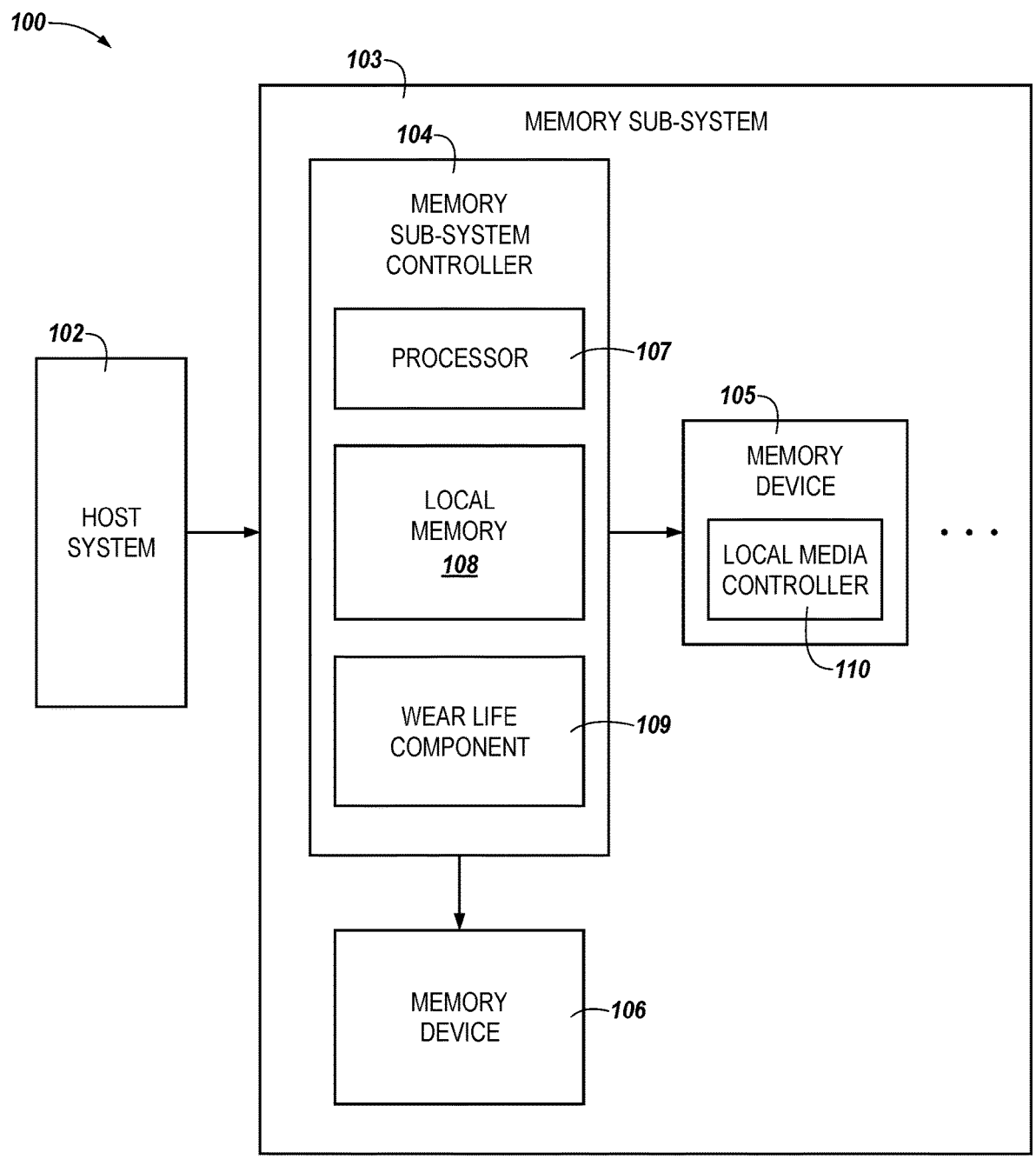
FIG. 1 illustrates an example of a computing system that includes a memory sub-system in accordance with some embodiments of the present disclosure.

Aspects of the present disclosure are directed to a selectable wear life indicator based on data retention for memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Wear life indicators (e.g., gauges) can be used to provide an indication of a remaining useful life of memory sub-systems (e.g., SSDs, UFS devices, eMMC devices, etc.). For example, a wear life indicator can be a gauge indicating a percentage of remaining life. Wear life indicators are often based on a program/erase (P/E) cycle capability of the underlying media (e.g., NAND cells, NOR cells, PCRAM cells, etc.), and the P/E cycle capability can be based on a data retention capability of the media. Data retention refers to the ability of a memory cell or page to retain stored data over a period of time in the absence of supplied power. Data retention is affected by various factors such as P/E cycles and temperature. In general, data retention time decreases as the P/E cycles increase.

Data retention values can be provided in terms of a length of time at a particular temperature (e.g., 3 months at 40 C), and the retention values generally correspond to retention at end of life. The end of life can refer to a point at which the memory sub-system is no longer considered reliable (e.g., at an upper P/E cycle limit of the sub-system). The end of life can also refer to a point at which the memory sub-system no longer meets requirements for the function of the memory sub-system (e.g., as per a system specification). The P/E cycle limit used for wear life indicators varies based on the retention capability of the memory sub-system. Therefore, the value of the wear life indicator at a current cycle count varies depending on the rated data retention capability. However, conventional memory sub-systems can often be rated at one particular data retention capability, which can be based on a JEDEC standard such as 3 months at 40 C, for instance. The particular data retention corresponding to a memory sub-system can be based on a particular usage model, which may or may not accurately reflect the actual usage of the memory sub-system. Therefore, the wear life indicators associated with conventional memory sub-systems may not accurately reflect the remaining life of a particular memory sub-system based on a desired and/or expected usage of the system.

For example, the JEDEC standard data retention of 3 months at 40 C can correspond to powered off data retention. However, in various instances a different (e.g., reduced) data retention can be acceptable for particular system utilizations. For instance, a memory sub-system used in a data center may be rarely, if ever, powered off. In such a scenario, the memory subsystem can be reliably used well beyond the rated P/E cycles corresponding to the rated data retention (e.g., 3 months at 40 C). That is, the wear indicator (e.g., life gauge) can read 0% life for a substantial portion of the memory subsystem (e.g., SSD) usage.

Aspects of the present disclosure address the above and other deficiencies by providing selectable data retention options (e.g., profiles). The selected data retention profiles provide a user the ability to obtain a more accurate wear life indicator (e.g., wear life gauge) for a given system usage. As described further below, the data retention profiles can be predetermined values (e.g., 1 month at 40 C, 3 months at 40 C, 1 year at 40 C, 1 month at 25 C, 3 months at 30 C, etc.). In various embodiments, a wear life indicator can be updated responsive to a change in the selected data retention profile.

In various examples, the wear life indicator can be a self-monitoring, analysis, and report technology (SMART) attribute. SMART is a monitoring system that can detect and report various indicators of drive reliability.

FIG. 1 illustrates an example of a computing system 100 that includes a memory sub-system 103 in accordance with some embodiments of the present disclosure. The memory sub-system 103 can include media, such as one or more volatile memory devices (e.g., memory device 106), one or more non-volatile memory devices (e.g., memory device 105), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 103, for example, to write data to the memory sub-system 103 and read data from the memory sub-system 103.

The host system 102 can be coupled to the memory sub-system 103 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access components (e.g., memory devices 105) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 104 as an example. In general, the host system 102 can access multiple memory sub-systems via a same communication connection, multiple separate communication connections, and/or a combination of communication connections.

The memory devices 105, 106 can include any combination of the different types of non-volatile memory devices and/or volatile memory devices. The volatile memory devices (e.g., memory device 106) can be, but are not limited to, random access memory (RAM), such as dynamic random access memory (DRAM) and synchronous dynamic random access memory (SDRAM).

The memory components can include non-volatile memory devices that store data from the host system. A non-volatile memory device is a package of one or more dice. The dice in the packages can be assigned to one or more channels for communicating with a memory sub-system controller. The non-volatile memory devices include cells (i.e., electronic circuits that store information) that are grouped into pages to store bits of data. The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array. Such non-volatile memory devices can group pages across dice and channels to form management units (MUs). A MU can include user data and corresponding metadata. A memory sub-system controller can send and receive user data and corresponding metadata as management units to and from memory devices. Another example of a non-volatile memory device is a negative-and (NAND) memory device. With NAND type memory, pages can be grouped to form blocks (e.g., groups of pages erased together as a unit).

Some examples of non-volatile memory devices (e.g., memory device 105) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 105 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 105, 106 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 105, 106 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) and 3D cross-point array of non-volatile memory cells are described, the memory device 105 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory devices 105 to perform operations such as reading data, writing data, or erasing data at the memory devices 105 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can be a processing device, which includes one or more processors (e.g., processor 107) configured to execute instructions stored in local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code, for example. While the example memory sub-system 103 in FIG. 1 is been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 105 and/or the memory device 106. The memory sub-system controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 105. The memory sub-system controller 104 can further include host interface circuitry to communicate with the host system 102 via the physical host interface. The host interface circuitry can convert the commands received from the host system into command instructions to access the memory devices 105 and/or the memory device 106 as well as convert responses associated with the memory devices 105 and/or the memory device 106 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 105.

In some embodiments, the memory devices 105 include a local media controller 110 that operates in conjunction with memory sub-system controller 104 to execute operations on one or more memory cells of the memory devices 105. For example, the memory device 105 can be managed memory device such as a managed NAND (MNAND), UFS, and/or eMMC device in which a local controller (e.g., 110) is combined with a memory device (e.g., within a same package). In such cases, the local controller 110 can be responsible for performing operations such as error correction and/or media management which would otherwise be performed by an external controller (e.g., 104).

In various embodiments, the memory sub-system 103 includes a wear life component 109. The wear life component 109 can be implemented as firmware of the controller 104; however, embodiments are not so limited. As described further herein, the wear life component 109 can provide data retention profiles that can be selected in order to generate respective wear life indicators corresponding to the memory sub-system 103. The wear life component 109 can receive a selection from the data relation profiles which can be used to generate the respective wear life indicator. The wear life indicator can be an indication of a remaining useful life (e.g., percentage life remaining) of the sub-system 103. The different selectable data retention profiles can correspond to respective system usage models. For example, a memory sub-system (e.g., SSD) can be employed as a server in a data center or in various other contexts such as mobile devices, personal computers, etc. A memory sub-system (e.g., SSD) can also be employed in an automotive application. Various applications of the memory sub-system can utilize a data retention that is greater than is provided in a standard such as the JEDEC. Often times, a memory sub-system has a corresponding data retention for which it is rated (e.g., according to a standard such as a JEDEC standard). One example of such a data retention standard is 3 months at 40 C, which corresponds to a powered off data retention at end of life. However, in a data center context, an SSD can rarely be powered off, so a wear life indicator based on the rated retention of 3 months at 40 C may not accurately reflect the useful life remaining. In various embodiments of the present disclosure, the wear life component 109 provides the ability to select a data retention profile that can be uses to provide a more accurate wear life indicator depending on the system usage. As described further herein, the wear life component 109 can use a current P/E cycle count to determine a current wear life indicator based on the selected data retention profile.

In some embodiments, the memory sub-system controller 104 includes at least a portion of the wear life component 109. For example, the memory sub-system controller 104 can include a processor 107 (processing device) configured to execute instructions stored in local memory 108 for performing the operations described herein. In some embodiments, the wear life component 109 is part of the host system 102, an application, or an operating system.

The data retention profiles stored by the wear life component 109 can be presented for selection. The selection of one of the data retention profiles can be used to identify which of the wear life indicators are used to calculate the life percent remaining of the memory sub-system 103. The selection of one of the data retention profiles can also be used to select a data retention comprising a duration of time and/or a temperature with which the life percent is calculated. As such, selection of one of the data retention profiles can be used to select a duration of time and/or a temperature with which the life percent is calculated.

In various examples, a data retention profile may not be selectable. Rather, the data retention profiles can be presented to inform of a life percent of the memory sub-system 103. In examples where the data retention profiles are not selectable, multiple data retention profiles can be provided at a same time. Each of the data retention profiles can be displayed along with corresponding wear life indicators to allow the user to view a wear life indicator that is agreeable to the user.

The controller 104 can also monitor the life percent calculated using the wear life component 109. The controller 104 can perform various actions based on the life percent. For example, the controller 104 can determine whether the life percent is less than or equal to a threshold life percent. If the life percent is less than or equal to the threshold life percent, then the controller 104 can inform (e.g., warn) the host system 102 that the life percent is less than or equal to a threshold life percent. The host can provide said warning utilizing an asynchronous event notification. The asynchronous event notification can be logged by the host system 102. The asynchronous event notification can be provided to a user or displayed via a display 588 of FIG. 5, for example.

The controller 104 can adjust the use of the memory sub-system 103 based on the life percent. For example, the controller 104 can also adjust the use of the memory sub-system 103 responsive to the life percent being less than or equal to a threshold life percent.

The controller 104 can cause the life percent to be displayed using the display 588. The controller 104 can also cause a data retention profile to be displayed using the display 588. The life percent and/or the data retention profile can be displayed to inform a user of the expected life of the memory sub-system 103 or the lack of life of the memory sub-system 103. The controller 104 can also cause the data retention profiles to be displayed to allow a user to select one of the data retention profiles. The controller 104 can utilized the selected data retention profile to calculate the life percent. Selecting different data retention profiles can result in different calculations of the life percent.

In some examples, the host system 102 can request a life percent and/or a data retention profile used to generate the life percent. The memory sub-system 103 can receive the request. The controller 104 of the memory sub-system 103 can utilize the wear life component 109 to generate the life percent and/or can retrieve a data retention profile. The memory sub-system 103 can return the life percent and/or the data retention profiles to the host system 102. The host system 102 can perform various actions based on the life percent and/or the data retention profiles or can cause the life percent and/or the data retention profiles to be displayed for a user. The user can determine whether the life percent is acceptable or not and/or weather the data retention profiles is acceptable or not.

The user can request life gauges if the life percent and/or the wear life gauge are not acceptable. Although the examples provided herein are provided to display life percentages and/or data retention profiles to a user of the computing system 100, the examples provided herein can also be used to provide the wear life indicators and/or wear life gauges to the host 102 or to a different host (not shown). The different host can make a determination and/or perform actions responsive to the life percentages and/or data retention profiles. The determination and/or actions performed can be made without input from a user.

For example, the host 102 can receive the life percent and perform actions responsive to receipt of the life percent. The host 102 can determine whether the life percent is lower than a life percent threshold. The host 102 can adjust the use of the memory sub-system 103 responsive to the life percent being lower than a threshold life percent. Adjusting the use of the memory sub-system 103 can include slowing down performance of the memory sub-system. Slowing down the performance of the memory sub-system 103 can extend the life of the memory sub-system 103 by reducing the PE cycles experienced by the memory sub-system 103 in a duration of time as compared to a memory sub-system 103 that did not experience a slowing down of its performance. The host 102 can slow down the performance of the memory sub-system 103 by providing signals to the memory sub-system 103 that cause the memory sub-system 103 to be reconfigured.

In various instances, a host and/or the memory sub-system controller 104 can determine that a wear life indicator of the memory device 105 and/or the memory sub-system 103 is less than a threshold. The host 102 and/or the memory sub-system controller 104 (e.g., via firmware) can take action by changing the programming behavior on the memory device 105 to reduce performance of the memory device 105 in exchange for additional data retention. For example, the host 102 and/or the memory sub-system controller 104 can cause a cache to be used responsive to determining that the wear life indicator of the memory device 105 is less than the threshold (e.g., wear life indicator threshold). The cache can be implemented in the local memory 108, the memory device 106, and/or the memory device 105, for example. The host 102 can provide commands to the memory sub-system controller 104 to cause the memory sub-system controller 104 to enable the cache.

Enabling the cache can include utilizing the cache where it was not previously used. Enabling the cache can also include utilizing the cache to a greater extent than the cache was previously utilized. For instance, the cache can store pages, of the memory device 105, that are larger than the pages that were previously stored by the cache.

Enabling the cache can increment the PE cycles of the memory device 105 and/or the memory sub-system 103 at a slower pace than the PE cycles would be incremented utilizing a memory sub-system 103 that does not enable the cache. Enabling the cache can prolong the life of the memory sub-system 103 and/or the memory device 105. Slowing the rate at which the PE cycles are incremented can extend the life of the memory device 105 given that wear life indicator of the memory device 105 is calculated using the PE cycles of the memory device 105 or the memory sub-system 103. Slowing the rate at which the PE cycles are incremented can include reducing the performance (e.g., reducing MB/s of the memory sub-system 103) of the of the memory sub-system 103 or adjusting (e.g., reducing) the capacity of the memory sub-system 103, for example. Reducing the capacity of the memory sub-system 103 can increase overprovisioning and reduce write amplification of the memory sub-system thus slowing the increase in PE cycles.

Utilizing the cache can reduce the PE cycles because data can be retrieved from the cache instead of the memory device after the data has been stored to the cache from the memory device 105. For instance, the data can be moved from the memory device 105 to the cache once. After the data is stored in the cache, the data can be accessed from the cache and not from the memory device 105. Each PE cycle experienced by the cache is a PE cycle not experienced by the memory device 105.

In various examples, there can be multiple wear life indicator thresholds. As the wear life indicator thresholds are breached then the host and/or the memory sub-system 103 can take increasingly escalating actions. For example, if the wear life indicator is lower than a first threshold, then the memory sub-system 103 can provide an asynchronous event notification to a host. If the wear life indicator is lower than a second threshold, then the memory sub-system 103 can select a data retention profile that increases the wear life indicator. If the wear life indicator is lower than a third threshold, then the memory sub-system 103 can take an action that prolongs the life of the memory device 105 such as by enabling the cache.

In various examples, the host 102 and/or the memory sub-system controller 104 can select a different data retention profile responsive to the wear life indicator being lower than the threshold wear life indicator. In various instances, the host 102 can provide signals to the memory sub-system 103 requesting the data retention profiles. The memory sub-system 103 can retrieve the data retention profiles from the wear life component 109. The memory sub-system 103 can provide the data retention profiles to the host system 102. The host system 102 can display the data retention profiles using display 588 in FIG. 5. A user of the computing system 100 can select one of the data retention profiles or the host 102 can select one of the data retention profiles without input from a user. The selection can be provided from the host 102 to the memory sub-system 103. The memory sub-system 103 can store the selection and utilized the selected data retention profile to generate the wear life indicator remaining of the memory sub-system 103. In a number of embodiments, a data retention profile can be provided during manufacturing of the memory sub-system 103 in order to provide customers sub-systems with different particular profiles.

Figure 2:
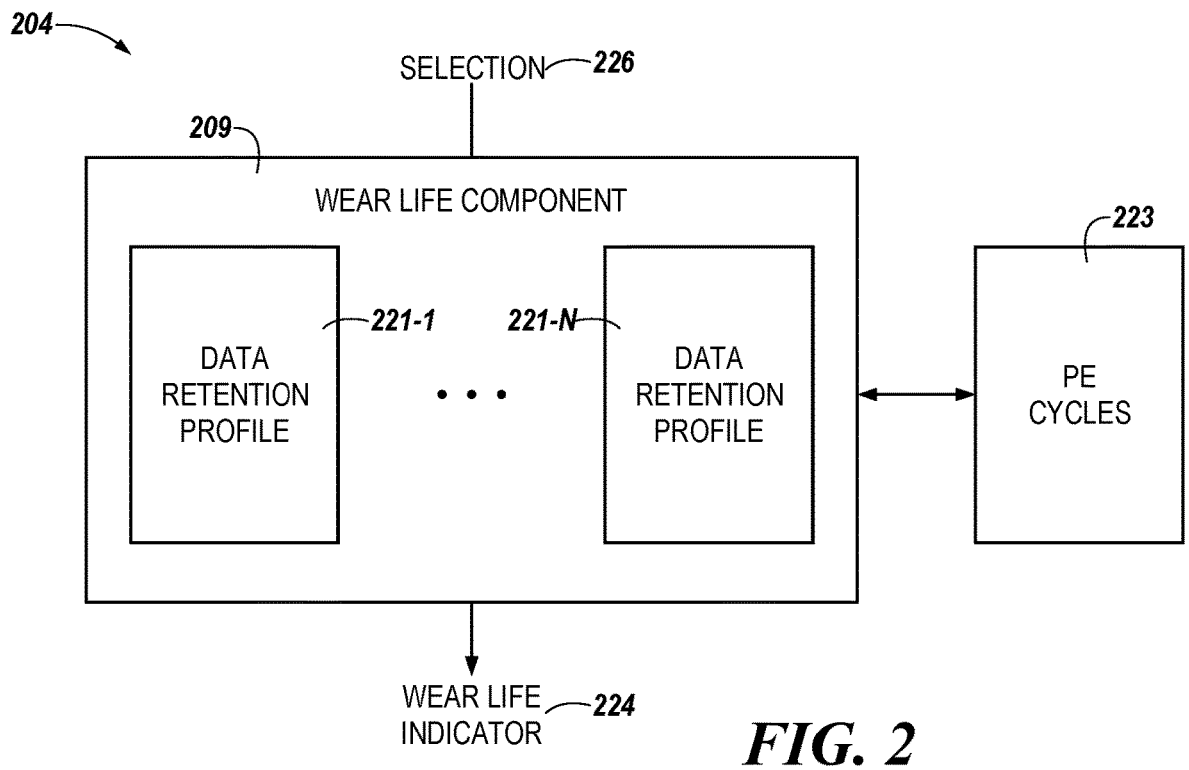
FIG. 2 illustrates a block diagram associated with a wear life component in accordance with some embodiments of the present disclosure.

FIG. 2 illustrates a block diagram associated with a wear life component 209 in accordance with some embodiments of the present disclosure. The wear life component 209 can include the data retention profiles 221-1 to 221-N. The data retention profiles 221-1 to 221-N can be referred to generally as data retention profiles 221. The wear life component 209 can receive a quantity of PE cycles 223 which can be stored in the local memory 108, among other memory of the controller 104 or the memory sub-system 103 of FIG. 1. The wear life component 209 can be implemented in firmware, although embodiments are not so limited. For example, the wear life component 209 or at least a portion thereof can be implemented in software, hardware, and/or firmware.

The different data retention profiles 221 can be implemented as tables indicating a percent life remaining based on the current PE cycle count of the memory sub-system or a memory device of the memory sub-system, whereas the different values in the tables themselves are based on system testing/characterization. That is, each of the data retention profiles 221 can yield/output a different wear life indicator for a particular current PE cycle count.

The wear life component 209 can generate the wear life indicator 224 (e.g., percentage of life remaining) based on the selected data retention profile 221 and on the current PE cycle count 223. The current quantity of PE cycles 223 can be used to generate the wear life indicator 224. The tables of values corresponding to each of the data retention profiles 221 can be based on a particular/different threshold quantity of PE cycles. For example, each of the data retention profiles 221 can comprise a different table that can map PE cycle counts to wear life indicators. The PE cycle counts corresponding to the different entries in the tables of the data retention profiles 221 can be referred to as threshold quantity of PE cycles.

The selection 226 of the data retention profiles 221 can be updated such that the selected data retention profile is the data retention profile 221-N instead of the data retention profile 221-1, at a different time. The tables of values corresponding to each of the data retention profile 221 can be based on a particular/different threshold quantity of PE cycles. For example, the quantity of threshold PE cycles can influence the mapping of PE cycles to data retention as defined by a table of the data retention profile.

In various examples, the PE cycles can be counted differently based on a temperature at which they occurred. For example, a PE cycle at 40 C can provide 50% of the stress, on the memory sub-system, of a PE cycle at 75 C. The memory sub-system controller (e.g., via firmward) can count PE cycles differently based on a temperature at which they occurred.

The threshold PE cycles can also be used to generate a threshold wear life indicator. The threshold quantity of PE cycles corresponding to the data retention profile 221-N can be different than the threshold quantity of PE cycles corresponding to the data retention profiles 221-1. For instance, the threshold quantity of PE cycles corresponding to the data retention profile 221-N can be greater than the threshold quantity of PE cycles corresponding to the data retention profile 221-1. Utilizing a greater threshold quantity of PE cycles can increase the threshold wear life indicator of the memory sub-system 103.

The selection 226 of the data retention profiles 221 can be an identifier (ID) or a pointer to one of the data retention profiles 221. The pointer can, for example, can point to one of the data retention profiles 221. The selection 226 can be used by the wear life component 209 to identify which of the data retention profiles 221 to use to calculate the wear life indicator 224. As such, the selection 226 and/or the data retention profiles can be stored internally to the wear life component 209 or externally to the wear life component 209.

In various instances, a selection can be received by the wear life component 209. The selection can identify the data retention profile 221-N. The selection can comprise an ID which can be referred to as the selection ID. Each of the data retention profiles 221 can have a corresponding ID which can be referred to as the data retention profile ID or time and temperature variables such as the time and temperature variables 333 in FIG. 3. That is, the data retention profile ID and the selection ID can represent the time and temperature variables from which the tables corresponding to the data retention profiles 221 are generated. For instance, a first table can map PE cycle counts to wear life indicators based on a first set of time and temperature valuables while a second table can map PE cycle counts to wear life indicators based on a second set of time and temperature variables.

In various examples, the wear life component 209 can receive a request for the data retention profiles 221. The data retention profiles 221 can be provided by the wear life component 209 and to a host. The host can respond by displaying the data retention profiles 221. The host can receive a selection for one of the data retention profiles 221. The host can provide the selection to the controller 204. The controller 204 can receive the selection 226 at the wear life component 209. The selection of a data retention profile from the data retention profiles 221 can be an initial selection or can be a selection after the initial selection.

In various examples, the wear life component 209 can provide the data retention profiles 221 and corresponding wear life indicator 224 to the host for display and not for selection. For instance, the host can display each of the data retention profiles 221 with a corresponding wear life indicator to a user. The host may not receive a selection for the data retention profiles 221, rather, the user can utilize the data retention profiles 221 to identify a data retention profile that best fits a criterion for the memory sub-system. The user can use one, non, or all of the data retention profiles 221.

The wear life component 209 can provide the data retention profiles 221. Providing the data retention profiles can include providing the data retention profiles with a longer data retention prior to providing the data retention profiles with a shorter data retention. Providing the data retention profiles 221 can also include providing data retention profiles with a shorter data retention prior to providing data retention profiles with a longer data retention.

Figure 3:
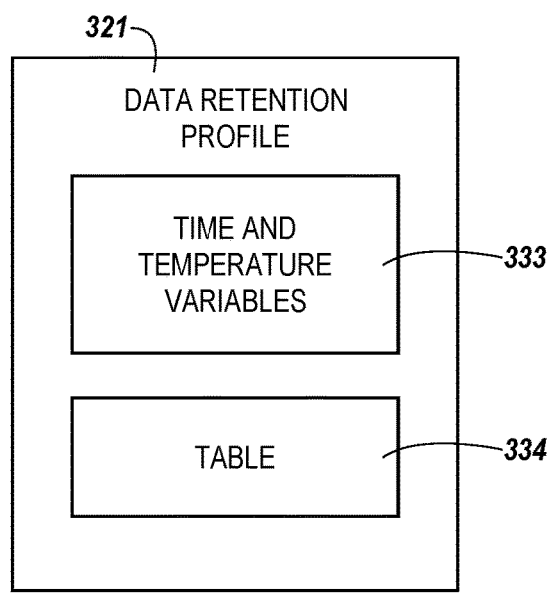
FIG. 3 illustrates a block diagram of a data retention profiles in accordance with some embodiments of the present disclosure.

FIG. 3 illustrates a block diagram of a data retention profile 321 in accordance with some embodiments of the present disclosure. The data retention profile 321 is analogous to the data retention profiles 221 in FIG. 2. The data retention profile 321 can comprise time and temperature variables 333 and a table 334.

The time and the temperature variables 333 can be used to identify the data retention profile 321. The time and temperature variables 333 can be any of the preselected durations of time and temperature. For example, the time and temperature variables 333 can be 3-months at 40° Celsius (C), 1-month at 40° C., 3-months at 25°, or 1-week at 25° C., among other possible examples. Although the data retention profile 321 is shown as storing the time and temperature variables 333, the time and temperature variables 333 can be stored externally to the wear life component 109 and wear life component 209 in FIG. 1 and FIG. 2, respectively.

The time and temperature variables 333 can correspond to the table 334. The table 334 is a mapping of PE cycles to retention points/percentages such as the wear life indicator 224 of FIG. 2. For instance, the wear life component 209 can receive a PE cycle count. The wear life component 209 can access the table 334. The wear life component 209 can use the PE cycle count and the table 334 to access the wear life indicator.

Figure 4:
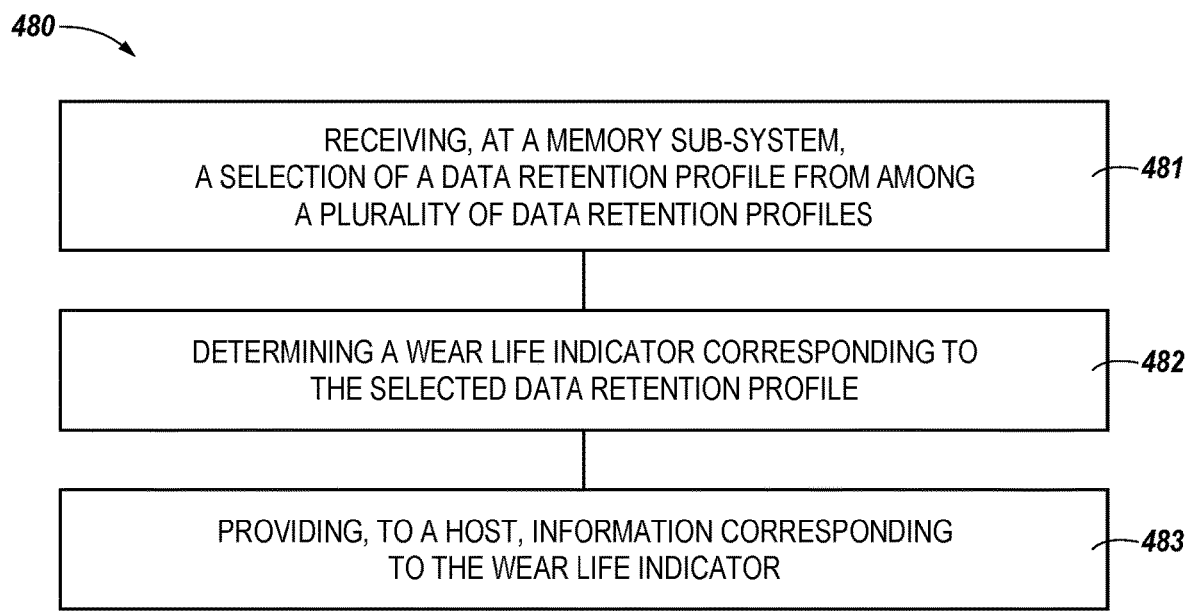
FIG. 4 is a flow diagram of an example of a method for selecting a wear life gauge in accordance with some embodiments of the present disclosure.

FIG. 4 is a flow diagram of an example of a method 580 for selecting a wear life gauge in accordance with some embodiments of the present disclosure. The method 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 480 is performed by the wear life component 109 of FIG. 1. Although shown in a particular sequence or order, unless otherwise specified, the order of the processes can be modified. Thus, the illustrated embodiments should be understood only as examples. The illustrated processes can be performed in an order different than is described herein. Some processes can be performed in parallel. Additionally, one or more processes can be omitted in various embodiments. Thus, not all processes are required in every embodiment. Other process flows are possible.

At block 481, a selection of a data retention profile from among a plurality of data retention profiles can be received at a memory sub-system. At 482, a wear life indicator corresponding to the selected data retention profile can be determined. At 483, information corresponding to the wear life indicator can be provided to a host.

The method 480 can include receiving a selection of a different data retention profile from among the plurality of data retention profiles. A wear life indicator can be adjusted based on the different data retention profile. The adjusted wear life indicator can be provided to the host. The adjusted wear life indicator can provide a longer life of the memory sub-system than the wear life indicator.

The wear life indicator can be provided to the host responsive to a request from the host. The host can display the wear life indicator. The wear life indicator can be displayed to allow a user to ascertain whether the memory sub-system should continue to be used.

The selection of the data retention profile from among the plurality of data retention profiles can be received by the memory sub-system. The plurality of data retention profiles can be fixed such that a quantity of the plurality of data retention profiles is predetermined and may not be modified. In various examples, the host can populate the table 334 by specifying a particular data retention at a particular temperature.

In various instances, the wear life indicator can be determined to be lower than a threshold (e.g., threshold wear life indicator). Responsive to determining that the wear life indicator is lower than the threshold, a wear life indicator can be adjusted based on a different data retention profile, wherein the adjusted wear life indicator is greater than the threshold.

In various examples, a data retention profile can be selected from among a plurality of data retention profiles corresponding to the memory device. The wear life indicator can be adjusted based on the selected data retention profile. The wear life indicator can comprise a wear life gauge indicating a percentage of remaining useful life of the memory device based on the selected data retention profile. The wear life indicator can comprise different wear life gauges other than a percentage of remaining useful life of the memory device. For example, the wear life gauges can describe a classification of remaining useful life of the memory device.

The plurality of data retention profiles can be associated with respective combinations of time and temperature values. At least two of the plurality of data retention profiles can be associated with a same temperature value. At least two of the plurality of data retention profiles can be associated with a same time value. In various examples, the plurality of data retention profiles can differ in regard to temperature and time.

The plurality of data retention profiles can be predetermined based on a characterization of the system. For example, time values and a temperature values corresponding to the data retention profiles can be predetermined based on a characterization of the system. The characterization of the system can include a use of the system. In various examples, the characterization of the system can include a type of cell (e.g., 2D, 3D NAND, SLC/MLC, trim values (read/write trims), etc.). The characterizations of the system can be determined based on a physical structure and testing of various different devices.

The wear life indicator can be adjusted via a wear life component. The wear life indicator can be adjusted based on the selected data retention profile. The wear life component can comprise a data structure matching the predetermined data retention profiles to different respective program/erase cycle counts.

The data retention profile can be selected responsive to a command received from a host. The command can be, for example, a SATA set feature command or a NVMe set feature command using a unique feature ID, which may be specific to a vendor. The command from the host can also be a vendor unique command provided using a SATA protocol, an NVMe protocol, a compute express link (CXL) protocol, and/or a universal flash storage (UFS) protocol, among other types of protocols. Vendor unique commands refer to commands that may not be industry specified such as commands using operation codes not defined by a standard corresponding to the particular protocol. A vendor unique command can be provided, for example, through one or more pins of an interface reserved for vendor unique commands (e.g., via a "side-band" interface).

In various examples, a non-transitory computer readable storage medium comprising instructions that, when executed by a processing device, cause the processing device to receive a selection of a particular data retention profile from among a plurality of selectable data retention profiles stored on a memory sub-system, determine a remaining life of the memory sub-system based on the selected data retention profile, and provide an indication of the remaining life of the memory sub-system to a host. The particular data retention profile can be selected based on a usage of the memory sub-system. The particular data retention profile can be different than a rated data retention profile corresponding to the memory sub-system, wherein the rated data retention profile is a default data retention profile. The selection of the particular data retention profile is received via a command from the host. The memory sub-system can initially be configured utilizing a rated data retention profile which is a default data retention profile. A different data retention profile other than the rated data retention profile can be selected and used to generate the wear life indicators.

Figure 5:
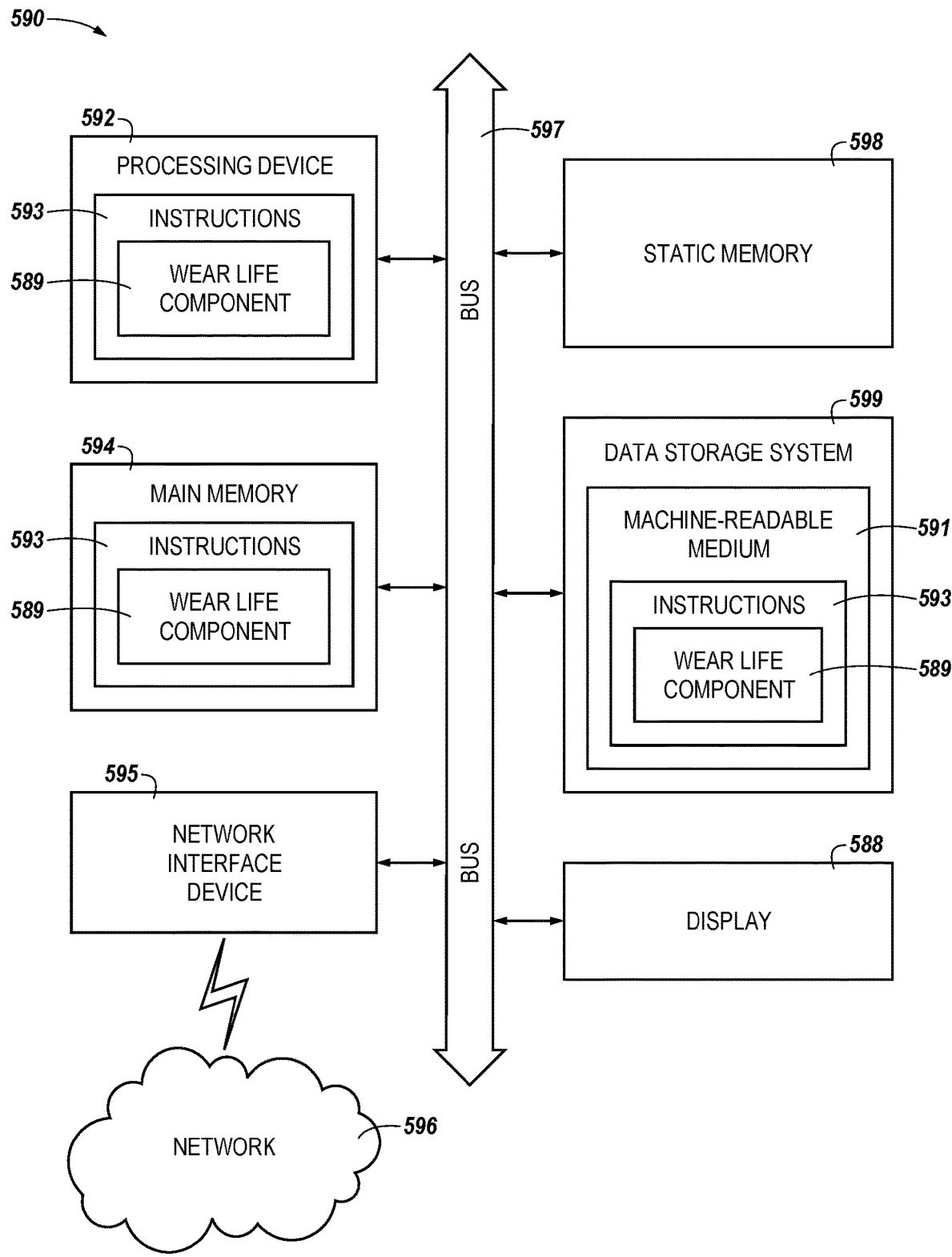
FIG. 5 is a block diagram of an example of a computer system in which embodiments of the present disclosure may operate.

FIG. 5 illustrates an example of a machine of a computer system 590 within which a set of instructions, for causing the machine to perform one or more of the methodologies discussed herein, can be executed. In some embodiments, the computer system 590 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to select a wear life gauge utilizing wear life component 109 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 590 includes a processing resource 592, a main memory 594 (e.g., read-only memory (ROM), flash memory, dynamic random access memory (DRAM) such as synchronous DRAM (SDRAM) or Rambus DRAM (RDRAM), etc.), a static memory 598 (e.g., flash memory, static random access memory (SRAM), etc.), and a data storage system 599, which communicate with each other via a bus 597.

The processing resource 592 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing resource 592 can also be one or more special-purpose processing devices such as an application specific integrated circuit (ASIC), a field programmable gate array (FPGA), a digital signal processor (DSP), network processor, or the like. The processing resource 592 is configured to execute instructions 593 for performing the operations and steps discussed herein. The computer system 590 can further include a network interface device 595 to communicate over the network 593.

The data storage system 599 can include a machine-readable storage medium 591 (also known as a computer-readable medium) on which is stored one or more sets of instructions 593 or software embodying one or more of the methodologies or functions described herein. The instructions 593 can also reside, completely or at least partially, within the main memory 594 and/or within the processing resource 592 during execution thereof by the computer system 590, the main memory 594 and the processing resource 592 also constituting machine-readable storage media. The machine-readable storage medium 591, data storage system 599, and/or main memory 594 can correspond to the memory sub-system 103 of FIG. 1.

In one embodiment, the instructions 593 include instructions to implement functionality corresponding to a compute component (e.g., the wear life component 109 of FIG. 1). The instructions can include a wear life component instruction 589 associated with selecting a data retention profile in a memory sub-system (e.g., wear life component 109 in FIG. 1). While the machine-readable storage medium 591 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

The display 588 can also be coupled to the bus 597. The display 588 can be used to interact with a user of the computer system 590. The display 588 can be used to provide a wear life indicator of a memory sub-system. The display 588 can also be used to display data retention profiles for selection. Although the examples described herein can be implemented utilizing the display 588, the examples described herein can also be implemented utilizing the network 596. For example, the wear life indicators and/or the data retention profiles can be provided to a user utilizing a network 596 and potentially a display that is not directly coupled to the bus 597.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The figures herein follow a numbering convention in which the first digit or digits correspond to the drawing figure number and the remaining digits identify an element or component in the drawing. Similar elements or components between different figures can be identified by the use of similar digits. For example, 109 can reference element "09" in FIG. 1, and a similar element can be referenced as 209 in FIG. 2. As will be appreciated, elements shown in the various embodiments herein can be added, exchanged, and/or eliminated so as to provide additional embodiments of the present disclosure. In addition, as will be appreciated, the proportion and the relative scale of the elements provided in the figures are intended to illustrate certain embodiments of the present invention and should not be taken in a limiting sense.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device;
    a processing device coupled to the memory device to:
        select a data retention profile, including a predetermined length of time at a predetermined temperature at a future end of life of the memory device that data is retained at the memory device in an absence of a power supply for the memory device, from among a plurality of data retention profiles, including a plurality of lengths of time and a plurality of temperatures that are predetermined, corresponding to the memory device;
        responsive to selecting the data retention profile, program a hardware component of the memory device to reduce performance of the memory device; and
        adjust a wear life indicator based on the selected data retention profile.

2. The system of claim 1, wherein the wear life indicator comprises a wear life gauge indicating a percentage of remaining useful life of the memory device based on the selected data retention profile.

3. The system of claim 1, wherein the plurality of data retention profiles are associated with respective combinations of time and temperature values.

4. The system of claim 3, wherein at least two of the plurality of data retention profiles are associated with a same temperature value.

5. The system of claim 1, wherein the plurality of data retention profiles are predetermined based on a characterization of the system.

6. The system of claim 5, wherein the system comprises a wear life component comprising instructions executable by the processing device to adjust the wear life indicator based on the selected data retention profile.

7. The system of claim 6, wherein the wear life component comprises a data structure matching the predetermined data retention profiles to different respective program/erase cycle counts.

8. The system of claim 1, wherein the processing device is configured to select the data retention profile responsive to a command received from the host.

9. The system of claim 8, wherein the command is a vendor unique command provided using one of:
    a serial advanced technology attachment (SATA) protocol;
    a non-volatile memory express (NVMe) protocol;
    a compute express link (CXL) protocol; or
    a universal flash storage (UFS) protocol.

10. A method comprising:
    receiving, at a memory sub-system, a selection of a data retention profile, including a predetermined length of time at a predetermined temperature at a future end of life of a memory device that data is retained at the memory device of the memory sub-system in an absence of a power supply of the memory device, from among a plurality of data retention profiles including a plurality of lengths of time and a plurality of temperatures that are predetermined;

responsive to receiving the selected data retention profile, programming a hardware component of the memory device to reduce performance of the memory device;

determining a wear life indicator corresponding to the selected data retention profile; and providing, to a host, information corresponding to the wear life indicator.

11. The method of claim 10, further comprising:

receiving a selection of a different data retention profile from among the plurality of data retention profiles;

adjusting the wear life indicator based on the different data retention profile; and providing the adjusted wear life indicator to the host.

12. The method of claim 11, wherein the adjusted wear life indicator provides a longer life of the memory sub-system than the wear life indicator.

13. The method of claim 10, further comprising:

providing the wear life indicator to the host responsive to a request from the host; and displaying the wear life indicator.

14. The method of claim 10, further comprising receiving the selection of the data retention profile from among the plurality of data retention profiles wherein a quantity of the plurality of data retention profiles is fixed.

15. The method of claim 10, further comprising determining that the wear life indicator is lower than a threshold.

16. The method of claim 15, further comprising, responsive to determining that the wear life indicator is lower than the threshold, adjusting a wear life indicator based on a different data retention profile, wherein the adjusted wear life indicator is greater than the threshold.

17. A non-transitory computer readable storage medium comprising instructions that, when executed by a processing device, cause the processing device to:

receive a selection of a particular data retention profile, including a predetermined length of time at a predetermined temperature at a future end of life of a device of a memory sub-system, that data is retained at the memory sub-system in an absence of a power supply of the memory sub-system, from among a plurality of selectable data retention profiles, including a plurality of lengths of time and a plurality of temperatures that are predetermined, stored on the memory sub-system;

responsive to selecting the particular data retention profile, program a hardware component of the memory sub-system to reduce performance of the memory sub-system;

determine a remaining life of the memory sub-system based on the selected data retention profile; and provide an indication of the remaining life of the memory sub-system to a host;

wherein the particular data retention profile is selected based on a usage of the memory sub-system, and wherein the particular data retention profile is different than a rated data retention profile corresponding to the memory sub-system.

18. The non-transitory computer readable storage medium of claim 17, wherein the selection of the particular data retention profile is received via a command from the host.

19. The non-transitory computer readable storage medium of claim 17, wherein the rated data retention profile is a default data retention profile.

20. The non-transitory computer readable storage medium of claim 17, wherein the memory sub-system comprises a solid state drive (SSD).

* * * * *